United States Patent
Reinheimer et al.

(10) Patent No.: US 7,776,955 B2
(45) Date of Patent: Aug. 17, 2010

(54) POLYURETHANE-GRAPHITE OXIDE COMPOSITE MATERIAL, METHOD FOR ITS PREPARATION AND ITS USE AS A FLAME RETARDANT AND AS A FIRE-PROOF SEAL

(75) Inventors: Arne Reinheimer, Zellerberg (DE); Antje Wenzel, Hofstetten (DE); Fengge Gao, Houghton Regis (GB); Qingchun Yuan, Nottingham (GB)

(73) Assignee: Hilti Aktiengesellschaft, Schaan (LI)

( * ) Notice: Subject to any disclaimer, the term of this patent is extended or adjusted under 35 U.S.C. 154(b) by 110 days.

(21) Appl. No.: 11/476,369

(22) Filed: Jun. 27, 2006

(65) Prior Publication Data

US 2006/0293443 A1 Dec. 28, 2006

(30) Foreign Application Priority Data

Jun. 28, 2005 (DE) ........................ 10 2005 029 997

(51) Int. Cl.
*C08G 18/08* (2006.01)
*C08L 75/04* (2006.01)
*C08K 9/02* (2006.01)
*C08K 5/32* (2006.01)
*C09K 21/00* (2006.01)

(52) U.S. Cl. ........................ 524/589; 521/155; 252/606; 524/259; 524/424

(58) Field of Classification Search ................... 524/589
See application file for complete search history.

(56) References Cited

U.S. PATENT DOCUMENTS

| | | | | |
|---|---|---|---|---|
| 5,169,876 A | * | 12/1992 | Heitmann et al. ........... 521/155 |
| 5,192,811 A | * | 3/1993 | Heitmann et al. ............. 521/99 |
| 6,552,098 B1 | * | 4/2003 | Bosch et al. ................ 521/170 |
| 6,602,925 B1 | * | 8/2003 | Van Den Bosch et al. ..... 521/99 |
| 7,025,696 B2 | * | 4/2006 | Sullivan et al. ............. 473/374 |
| 2004/0000735 A1 | * | 1/2004 | Gilbert et al. .............. 264/40.1 |
| 2004/0127621 A1 | * | 7/2004 | Drzal et al. ................. 524/424 |
| 2004/0166049 A1 | * | 8/2004 | Reinheimer et al. ......... 423/448 |
| 2004/0183051 A1 | * | 9/2004 | Wenzel et al. ........... 252/378 R |
| 2004/0186041 A1 | * | 9/2004 | Wenzel et al. ............... 510/511 |
| 2004/0256605 A1 | * | 12/2004 | Reinheimer et al. ......... 252/606 |
| 2006/0100036 A1 | * | 5/2006 | Sullivan et al. ............. 473/371 |
| 2006/0148965 A1 | * | 7/2006 | Drzal et al. ................. 524/496 |
| 2006/0148966 A1 | * | 7/2006 | Drzal et al. ................. 524/496 |
| 2006/0231792 A1 | * | 10/2006 | Drzal et al. ............ 252/188.28 |

FOREIGN PATENT DOCUMENTS

| | | | | |
|---|---|---|---|---|
| JP | 01040588 A | * | 2/1989 |
| JP | 01299870 A | * | 12/1989 |
| JP | 01311137 A | * | 12/1989 |
| JP | 02253936 A | * | 10/1990 |

OTHER PUBLICATIONS

Kang et al., "Influences of H2O2 on Synthesis of H2SO4-GICs," J. Phys. Chem. Solids, vol. 57, Nos. 6-8, pp. 889-892, 1996.

* cited by examiner

*Primary Examiner*—Marc S Zimmer
*Assistant Examiner*—Noah Frank
(74) *Attorney, Agent, or Firm*—Abelman. Frayne & Schwab

(57) ABSTRACT

A polyurethane-graphite oxide composite material or nano composite is described, containing graphite oxide in expanded form present optionally, together with a phyllosilicate in expanded form in a polyurethane matrix, a method for the preparation of this composite material as well as its use as a fire retardant or as a flame-retardant seal for openings and/or bushings in walls, floors and/or ceilings of buildings.

33 Claims, No Drawings

POLYURETHANE-GRAPHITE OXIDE COMPOSITE MATERIAL, METHOD FOR ITS PREPARATION AND ITS USE AS A FLAME RETARDANT AND AS A FIRE-PROOF SEAL

FIELD OF INVENTION

The present invention relates to a polyurethane-graphite oxide composite material, a method for its preparation and its use as a flame retardant and as a fire-proof seal for openings and/or bushings in walls, floors and/or ceilings of buildings. The inventive polyurethane-graphite oxide composite material is also referred to as a polyurethane-graphite oxide nano composite, because the polyurethane is present between crystalline layers of the graphite oxide, the distances between the layers of graphite oxide being expanded by the intercalation of the polyurethane, the distances then ranging from 0.7 to 400 nanometers.

DESCRIPTION OF THE PRIOR ART

It is well known that plastics, and, especially, molded plastic objects, particularly those of plastic foam, undergo an appreciable change in shape in the event of a fire, because they melt and, in so doing, are deformed, or are decomposed due to the action of temperature and flames and, with that, are eroded. This is a problem, particularly in the case of plastics and molded plastic objects, which are used in fire-retardant compositions or as flame retardants for positioning openings, wall bushings, wall bushings for pipes, cable lead-throughs and other openings in walls, floors and/or ceilings of buildings by means of a bulk head.

In order to increase the fire-resistance rating of such plastics and molded plastic objects, additives are usually introduced into the plastic material. These additives include flame inhibitors, flame retardants, ablation fillers, glass-forming and ceramic-forming fillers, resinifying, carbonizing and intumescing systems (fire-retardant additives). The incorporation of certain components, which increase the fire-resistance rating, directly in the polymer so that these components are linked covalently with the plastic material (reactive fire retardants), represents a different possibility.

As a result of this addition or incorporation of additives, a carbonized crust of ash is formed as a physical barrier against heat transfer, permeability and formation of pyrolysis fragments and/or fuel in the flame region during the combustion of the plastic or of the molded plastic body. In general, it has turned out that a high yield of carbon during the combustion of the plastics or of the molded plastic objects has an inhibiting effect on the flammability of the polymers present. The amount and thickness of the ash crust formed is therefore taken as the significant parameter for evaluating the effectiveness of a flame retardant.

Aside from these quantitative effects, the gas permeability, vapor permeability, reactivity and especially the stability of the ash crust are relevant for passive fire protection.

In addition to the possibilities addressed above of incorporating additives, bringing about the desired effect, or bonding them covalently in the plastic, the possibility of using so-called nano composites, that is, composite materials, in which active ingredient particles with a particle size in the nano range are present in a polymer matrix, has also been discussed recently within the scope of research and development in the flame retardant sector.

Research studies to develop polymeric nano composites, which were intensified internationally, especially in the 1990s because of the results achieved in Japan with polyamide-6, were aimed at producing improvements in properties and combinations of properties, which cannot be attained with conventional fillers, such as an increase in strength and stiffness of the materials with retention of the toughness and the optical transparency of the polymer matrix. For example, polyamide-6/phyllosilicate nano composite are produced by the ring-opening polymerization of $\epsilon$-caprolactam in the presence of cation-exchanged montmorillonite.

SUMMARY OF THE INVENTION

By means of this method, a polyamide/phyllosilicate nano composite is produced with silicate layers (delaminated structure) distributed either randomly in the polymer matrix or with well-oriented silicate multilayers, with distances between the layers of the silicate of a few nanometers (intercalated structure). The polymer is therefore intercalated between the silicate layers. Due to the clear expansion in the distances between the layers of the phyllosilicate brought about in this way, the effective surface area is enlarged extremely, so that the filler content of the polymer matrix can be decreased drastically. In comparison to traditional polymers, provided with fillers, polymer/phyllosilicate nano composites exhibit improved mechanical properties.

The preparation, the properties and the use of such polymer/phyllosilicate nano composites are described, for example, by M. Alexandre et al. (Materials Science and Engineering, 28 (2000), 1-63). The nano composites are based on phyllosilicates, particularly 2:1 phyllosilicates, such as montmorillonite, hectorite and saponite. Thermoplastic, heat-curable and elastomeric plastic materials may be used as polymers, particularly polymethylmethacrylate, polyamides, polystyrene, polyethylene terephthalate, epoxide resins, rubber-epoxide resin materials as well as elastomeric polyurethanes. It has been described that, due to the interaction of the phyllosilicates and the polymers, different types of composite materials can be formed, particularly those, in which the polymer is unable to penetrate between the silicate layers, so that the phyllosilicate particles are present in the form of a separate phase in the composite material. If the polymer material penetrates between the layers of the phyllosilicate, an intercalated structure results, in which a single or, in certain cases, also several polymer layers are present between the silicate layers, which, in turn, are embedded in the form of a well-ordered multilayered arrangement, with alternating layers of the polymer and the phyllosilicate. A delaminated or exfoliated structure exists if the silicate layers of the phyllosilicate are separated completely and dispersed uniformly in a continuous polymer matrix.

It is furthermore stated in this publication that such polymer/phyllosilicate composites have improved mechanical and thermal properties, in that they not only have a higher thermal stability, but also, due to the formation of an insulating and incombustible crust of ash, provide advantageous flame-retarding effects at a relatively low content of filler.

On the other hand, it is known that polymers, such as polystyrene, polyvinyl alcohol or polyvinyl methacrylate may be intercalated between the layers of graphite or graphite oxide. In this way, polymer/graphite nano composites or polymer/graphite oxide nano composites are obtained, which exhibit a significant reduction in flammability and improved mechanical properties (P. Xiao et al., Polymer 42 (2001), 4813-4816, F. M. Uhl et al., Polymer Degradation and Stability 76 (2002), 111-122, J. Xu et al., Polymer Degradation and Stability 73 (2001), 29-31; and G. G. Chen at al., Journal of Applied Polymer Science, vol. 82 (2001), 2506-2513).

As in the case of the polymer/phyllosilicate nano composite's, these polymer-graphite nano composites are produced in that the monomers, which are to be polymerized, are introduced as intercalate compounds into the phyllosilicate or the graphite or the graphite oxide with formation of a phyllosilicate-graphite or graphite oxide intercalation compound, and the intercalation compounds, obtained in this way, are subjected in the usual way to the polymerization conditions necessary for the in situ polymerization of the monomers, In the event of a fire, such polymer-phyllosilicate nano composites, during the combustion of the polymer at the polymer surface, form a barrier of silicate layers at the polymer surface, which, on the whole, significantly increases the thermal stability of the remaining material.

This effect is based essentially on the fact that the input of heat, as well as the supply of oxygen necessary for the combustion and the emergence of thermal decomposition products at the surface, which, in turn, would support the combustion there, are made significantly more difficult by a labyrinth-like access path, which is caused by the silicate layers present in the material. The use of such systems for fire protection presents itself therefore from the point of view of reduced peak values for the release of heat. It has turned out, however, that a VO Classification during the Flammability Test according to the UL 94 Regulation cannot be attained with such phyllosilicate-polymer nano composites alone.

Even though it is known from the state of the art discussed above, that an improvement in the fire-retardant effect can be achieved with polymer/phyllosilicate nano composites or polymer/graphite nano composites, particularly by a qualitative and quantitative improvement in the ash crust formed in the event of a fire, such composite materials have proven to be inadequately effective for achieving the aimed-for and necessary fire-retardant or flame-retardant effects. In particular, the structure of natural phyllosilicates, which is necessary for a reproducible, good production of such nano composites, varies depending on the type and deposited of the phyllosilicate and on the supplier. This makes it difficult to produce a qualitatively constant product of the flame-retardant materials with the aimed-for uniform fire-retardant behavior.

OBJECT OF THE INVENTION

It is therefore an object of the present invention to make available polymer/graphite oxide composite materials of the above-defined type, which, in the event of a fire, lead to very dense, stable ash crust structures, which are clearly superior to those of conventional materials.

SUMMARY OF THE INVENTION

Surprisingly, it has turned out that this is possible with the help of polyurethane-graphite oxide composite materials, which contain graphite oxide in an expanded form in a polyurethane matrix. This was not to be anticipated in any way, since it was to be expected that the oxygen groups and reactive centers, present in the graphite oxide, could react with the polyisocyanate, necessary for the formation of the polyurethane, so that it would have to be assumed that, due to insufficient cross-linking or due to premature reaction of the reactants, problems will arise with the selective production of polyurethanes with certain aimed-for properties. Although, because of their applications spectrum from prefabricated motor parts to the formation of in situ foam, polyurethanes are particularly attractive as products for passive fire protection, products on the basis of this class of polymers evidently have not become known because of the chemistry of the formation of the polyurethanes, The invention therefore relates to polyurethane-graphite oxide composite material of the main claim. The dependent claims relate to preferred embodiments of this inventive object, as well as to the method for preparing this composite material and its utilization.

The object of claim 1 accordingly is a polyurethane-graphite oxide composite material or a polyurethane-graphite oxide nano composite, which is characterized by a content of graphite oxide, present in expendable form in a polyurethane matrix. The polyurethane matrix is conventional hard, soft or elastomeric polyurethane, which may be foamed, not foamed or foamable.

The graphite oxide is present in expanded form in this polyurethane matrix, that is, in a form, in which the distance between the layers of the crystalline lattice of the graphite oxide is greater than that in the native material, because the polyurethane matrix is present also between these graphite oxide layers. Accordingly, the graphite oxide preferably is present as a nano composite in the form of graphite oxide layers distributed randomly in the polyurethane matrix (delaminated structure) and/or in the form of well oriented graphite oxide multilayers, between which the polyurethane matrix material is intercalated (intercalated structure). In the polyurethane matrix, in the case of the inventively preferred variation, for which the graphite oxide with the intercalated structure is present in the polyurethane matrix, the distance between the layers of graphite oxide is between 0.7 nm and 400 nm and preferably between 0.9 nm and 200 nm. In this connection, it should be noted that the distance between the graphite layers in native graphite oxide is 0.3 nm. For the graphite oxide, preferably used to produce the polyurethane-graphite oxide composite material, the distance between the individual layers is approximately 0.77 nm.

In accordance with a preferred embodiment of the invention, the distance between the layers of the graphite oxide with an intercalated or delaminated structure is at least 100% greater than the distance between the layers of the starting graphite oxide.

The graphite oxide particles, present in the composite material, preferably have an average particle size of 0.2 μm to 150 μm and preferably of 2 μm to 100 μm. In this connection, it has turned out that, during the synthesis of the graphite oxide used pursuant to the invention as starting material, after the expansion of the distance between the layers and during the oxidation step, the working up and the washing to a neutral pH, agglomerates may be formed and the particles may reach a size of up to 150 μm. However, these agglomerates consist of graphite oxide particles with a particle size of the order of about 2 μm. However, the agglomerates used during the subsequent preparation of the inventive composite material are subjected to a mechanical action under the synthesis conditions, particularly during the treatment in the ultrasonic bath, so that they may break down once again into smaller particles, so that a relatively large range of particle sizes results.

Preferably, the inventive polyurethane-graphite oxide composite material contains 0.1 to 30% by weight and preferably 0.5 to 10% by weight of the graphite oxide, based on the total weight of the polyurethane-graphite oxide composite material.

In accordance with a preferred embodiment, the inventive polyurethane-graphite oxide composite material additionally contains a phyllosilicate, preferably a 2:1 phyllosilicate, in particular, montmorillonite, hectorite and/or saponite. This phyllosilicate may be modified or not modified. In the case of this composite material also, the phyllosilicate preferably is present as a nano composite in the form of silicate layers (delaminated structure), randomly distributed in the polyurethane matrix, and/or in the form of well oriented silicate multilayers, between which the polyurethane matrix material is intercalated (intercalated structure) in addition to the graphite oxide in the polyurethane matrix. Moreover, the polysilicate with the intercalated structure preferably has a distance between the layers of silicate of 0.7 nm to 400 nm and preferably of 0.9 nm to 200 nm. Preferably, the distance between the layers of the phyllosilicate with the intercalated or delaminated structure is at least 100% greater than the distance between the layers of the phyllosilicate used as starting material.

The phyllosilicate particles, present in the composite material, preferably have an average particle size of 0.2 µm to 150 µm and preferably of 2 µm to 100 µm. In this case also, the phyllosilicates may be present in the form of agglomerates, which may de-agglomerate during the intercalation treatment with the formation of smaller individual particles forming the agglomerates.

In accordance with this preferred embodiment, the inventive composite material preferably contains 0.1 to 30% by weight and, particularly, 0.5 to 10% by weight of the phyllosilicate, the total amount of graphite oxide and phyllosilicate in the composite material being 0.1 to 30% by weight and preferably 0.5 to 10% by weight, based on the total weight of the polyurethane-graphite oxide composite material. Preferably, the graphite oxide and the phyllosilicate are present in a ratio by weight of 10:1 to 1:10, and particularly of 5:1 to 1:5.

The inventive polyurethane graphite oxide-composite material preferably is obtainable by an in situ polycondensation of at least one polyol, present as intercalated compound in the graphite oxide and optionally in the phyllosilicate, with at least one polyisocyanate or by the in situ polycondensation of at least one polyisocyanate, present as intercalated compound in the graphite oxide and optionally in the phyllosilicate, with a polyol.

The inventive polyurethane-graphite oxide composite material may be present in the form of a hard, soft or elastomeric, foamed, foamable or not foamed polyurethane system, such system as a foamed coating, as an optionally foamable and optionally curable molding composition, as a curable molded part, as a foamed molded composition, as a foamed molded part or as a one-component or two-component in situ foaming system.

A further object of the invention relates to a method for the preparation of the above-defined polyurethane-graphite oxide composite material, which is characterized in that at least one polyol, intercalated in graphite oxide and optionally in the phyllosilicate, and subsequently, the graphite oxide-intercalation compound obtained, optionally together with the phyllosilicate-intercalation compound, is reacted with at least one polyisocyanate to form the polyurethane, or at least one polyisocyanate, intercalated in graphite oxide and optionally in the phyllosilicate and, subsequently, the graphite oxide-intercalation compound, optionally, the phyllosilicate intercalation compound is reacted with at least one polyol to form the polyurethane. For this method, the graphite oxide and optionally the phyllosilicate is used with an average particle size of 0.2 µm to 150 µm and preferably of 2 µm to 100 µm.

In accordance with a further embodiment, the graphite oxide may be subjected to a treatment with a quaternary ammonium salt and/or a catatonic surfactant, preferably with cetyl triethylammonium bromide, before the intercalation of at least one polyol, in order to modify the polarity of the graphite oxide or to enlarge the distances between the layers of graphite oxide or the layers of silicate.

The graphite oxide, used pursuant to the invention, is well-known to those of ordinary skill in the art. It is prepared by the oxidation of graphite with potassium chlorate in a mixture of sulfuric and nitric acids, as described, for example, in Römpp, Lexikon Chemie, $10^{th}$ edition, volume 2 (1997), page 1602. Preferably, graphite oxide is prepared by the reacting graphite with an oxidizing agent, such as potassium permanganate, using known methods. Before the intercalation of the at least one polyol or polyurethane, the graphite oxide is washed preferably with distilled water to a pH of 6 to 8 and preferably to a neutral pH of, for example, 7.

For the preparation of the polyurethane matrix, conventional polyols, polyisocyanates and catalysts are used for the polyurethane-forming reaction. For example, a polyether polyol and/or a polyester polyol with a hydroxyl number of 30 to 1000 and preferably of 500 to 1000 and an average hydroxyl functionality per molecule of 2 to 7 and preferably of 2 to 4 is used, or also an aminopolyether polyol and/or polyols based on phosphate esters with hydroxyl numbers of 30 to 1000 and preferably of 100 to 300 and an average hydroxyl functionality per molecule of 2 to 7 and preferably of 3 to 5.

As polyisocyanates, preferably polyisocyanates with an NCO content of 5 to 55% and preferably of 20 to 50% and an average of 2 to 5 and preferably of 2 to 4 NCO groups per molecule are used. Particularly preferred polyisocyanates are those based on methylene diphenyl diisocyanate and/or polymeric homologs thereof. In the event that a polyurethane foam is produced, preferably water is added in an amount, which produces a polyurethane foam of the desired foam density. Alternatively, however, physical blowing agents may also be added. As catalysts for the reaction of the polyol with the polyisocyanate, preferably a mixture of catalysts, which favor the polyurethane formation reaction with formation of polyisocyanurate groups (trimerization catalysts) and optionally polyurethane groups and/or polyurea groups, are used. Catalyst, which favor the formation of polyurethane groups, polyurea groups and polyisocyanurate groups are known to those of ordinary skill in the art. Preferably, they are metal salts of organic and/or inorganic acids, such as dialkali metal salts or alkaline earth metal salts of carboxylic acids, such as sodium acetate, potassium acetate, potassium adipate, sodium benzoate, potassium octoate or also tin salts, such as tin octoate or lead octoate, or aliphatic and aromatic amines, preferably tertiary amines, such as 2,4,6-tris(dimethylaminomethyl)-phenol, triethylamine, N-ethylmorpholine, N-methyl-morpholine, tetramethyliminobis-propylamine and the like. The reaction mixture, furthermore, may contain flame retardants and intumescing materials, which increase in volume upon being heated, as well as fillers, foam stabilizers, dyes, pigments, and further known auxiliary materials. In connection with the nature and the amount of the materials used to form a polyurethane matrix, reference is made to the disclosure of the DE 198 60 399 C2.

A further object of the invention is the use of the polyurethane-graphite oxide composite material described as a fire retardant and for the flame-retardant sealing of openings and/or bushings in walls, floors and/or ceilings of buildings. For this purpose, the polyurethane-graphite oxide composite material, may either be prepared previously and brought into the desired shape by appropriate processing, or the material may be foamed in situ preferably as an in situ foam, within the openings, which are to be sealed. For this purpose, the polyol component and the polyisocyanate component are present in separate containers, for example, in two-component containers, from which the materials, which have the necessary viscosity, are expressed through a mixing nozzle into the opening, which is to be sealed, under the action of mechanical forces or by using a blowing agent. The materials then foam up in this opening and react, forming an inventive polyurethane foam-graphite oxide composite material.

Surprisingly, it has turned out that, when graphite oxide is used as starting material for the in situ polycondensation of polyol or polyisocyanate, contained in the graphite oxide as an intercalate compound, nano composites may be obtained, which are distinguished by surprisingly good fire-protection properties, particularly in that they form an ash crust, which has mechanical and thermal stability, which is appreciably greater than that of the ash crusts, which are obtained with the conventional polymer/phyllosilicate nano composites or polymer/graphite oxide nano composites.

The following examples are intended to explain the invention further.

EXAMPLE 1

Preparation of Graphite Oxide

A round bottom flask, equipped with a stirrer and cooled in an ice bath, is charged with 10 g of graphite powder and 230 mL of concentrated sulfuric acid. While stirring intensively, 30 g of potassium permanganate are added in portions, the reaction temperature not exceeding 10° C. Subsequently, the reaction mixture is stirred for 30 minutes at 35° C., after which 460 mL of distilled water are added. This leads to an increase in temperature to about 98° C. and this temperature is maintained for a further 15 minutes. Excess potassium permanganate is then decomposed by the addition of 250 mL of distilled water and 100 mL of 30% hydrogen peroxide solution. The product, obtained in this way, is filtered off, washed with 5% hydrochloric acid until free of sulfate, neutralized with distilled water, and subsequently dried under vacuum at 50° C., the desired graphite oxide powder being obtained (with a maximum particle size distribution of <2 µm).

EXAMPLE 2

Preparation of a Polyurethane Foam-Graphite Oxide Composite Material (Nano Composite)

The graphite oxide (0.15 g), obtained in Example, 1, is mixed with 0.15 g of water, 5 g of polyethylene glycol (molecular weight of 300) and 5 mg of 1,4-diazabicyclo[2,2,2] octane. This mixture is then treated for 30 minutes in an ultrasonic bath. By means of this treatment, the polyethylene glycol is intercalated into the graphite oxide with expansion or widening of the lattice layers. This means that the polyethylene glycol is intercalated between the lattice layers. Subsequently, the reaction mixture is reacted with 4.67 g of toluene diisocyanate (TDI) to form a polyurethane foam-graphite oxide composite material. The Durometer hardness of the polyurethane foam-graphite oxide composite material obtained is 88.

For comparison, the Durometer hardness of a polyurethane foam, prepared in the same way but without using graphite oxide, is only 72.

The Durometer hardness of a polyurethane foam, prepared in the same way but with graphite oxide not in the expanded form, but only in the admixed form, is only 68. This comparison material was prepared in the manner described above. However, graphite was used instead of graphite oxide, as a result of which, because of the small distance between the layers and the polarity of the graphite, there was no intercalation of polyol between the graphite layers, and therefore no formation of a nano composite.

The Durometer hardness given is a standard measure of the hardness of vulcanized rubber, plastics and other nonmetals. The Durometer hardness is determined by the ASTM method D2240. In the present case, the Durometer hardness is determined using a conventional commercial Durometer (Rex Durometer Model 1600, for Type 00 Shore hardness measurements). The Durometer has a spring-loaded, hemispherical impressions stamp (of 2.4 mm diameter, and 2.7 mm length), with which the Durometer hardness is determined by means of the degree of penetration of the impressions stamp into the sample, which is to be investigated.

The dimensional unit of Durometer hardness varies between the 0 and 100, the number 100 denoting that the depth of penetration of the impressions stamp into the sample is 0.

The composite materials, obtained in the above manner, were investigated with respect to the stability of the ash crust formed during combustion. For this purpose, macroscopic test pieces with the dimensions of 2×2×6 cm were exposed on one side to a flame for a period of one minute with the help of a Bunsen burner, in order to ensure that the ash is not burned away. The Durometer hardness was measured in the manner described above. The Durometer hardnesses of the starting composite material and of the ash crusts, produced by the burning, are summarized in the following Table 1.

TABLE 1

| Material | Durometer Hardness (Starting Material) | Durometer Hardness. (Ash Crust) |
| --- | --- | --- |
| Polyurethane foam, not modified (comparison) | 72 | 0 |
| Polyurethane foam, graphite simply mixed in | 68 | 0 |
| Polyurethane foam-graphite oxide, composite material (nano composite) (invention) | 88 | 43 |

It can be seen readily from Table 1 above, that the inventive composite material, with a slightly higher Durometer hardness of the starting material, results in a surprisingly stable ash crust with a Durometer hardness of 42, whereas the ash crusts of the comparison materials had a Durometer hardness of 0 and, with that, do not have any of the strength necessary for fire protection.

EXAMPLE 3

Preparation of a Polyurethane Foam-Graphite Oxide+Phyllosilicate Composite Material (Nano Composite)

The graphite oxide (0.075 g), prepared in Example 1, 0.075 g of sodium montmorillonite, 0.15 g of water, 5 g of polyethylene glycol (with a molecular weight of 300) and 5 mg of 1,4-diazabicyclo[2.2.2]octane are mixed and the mixture is treated subsequently for 30 minutes in an ultrasonic bath. By means of this treatment, the polyethylene glycol is intercalated with expansion or widening of the lattice layers of the graphite oxide and of the sodium montmorillonite, that is, the polyethylene glycol is incorporated between these layers. The polycondensation reaction is then brought about by reacting the material obtained with 4.67 g of toluene diisocyanate (TDI) with formation of the desired polyurethane foam-graphite oxide+montmorillonite composite material (nano composite).

Thermogravimetric analysis of the resulting polyurethane composite material with graphite oxide and montmorillonite (1:1) at 900° C. yields an ash residue of 17.3% by weight of the starting material.

A polyurethane nano composite, produced in the same way, but containing only montmorillonite in a total amount of 0.15 g has an ash residue in this thermogravimetric analysis at 900° C. of only 12.7% by weight.

The Durometer hardness values, determined by the method described in Example 2, are listed in the following Table 2

TABLE 2

| Material | Durometer Hardness (Starting Material) | Durometer Hardness. (Ash Crust) |
|---|---|---|
| Polyurethane foam, montmorillonite (comparison) | 88 | 41 |
| Polyurethane foam-graphite oxide montmorillonite composite material (nano composite) (invention) | 88 | 42 |

The weight loss of the sample as a function of temperature or time was determined by thermogravimetric analysis. For this purpose, the sample is transferred into a corundum crucible and placed on the balance of a thermogravimetric device. This balance is in a furnace, which is integrated in the device and can be subjected to a dynamic or isothermal temperature control program. In the present case, a dynamic mode was employed with a heating rate of 10° 10 minute over a temperature range from 25° C. to 1100° C. Synthetic air, having a flow rate of 50 mL per minute, was used as an analysis gas. A 10 to 30 mg sample of the material to be investigated was transferred to the 150 μL corundum crucible used as sample vessel.

The residues of the products of Examples 2 and 3, subjected to this thermogravimetric analysis, are given in the following Table 3.

TABLE 3

| System | Residue of the thermogravimetric analysis at 900° C. (percent by weight) |
|---|---|
| Polyurethane foam, not modified (comparison) | 0 |
| Polyurethane foam, simple mixture with graphite (comparison) | 0 |
| Polyurethane foam-graphite composite material of Example 2 (invention) | 0 |
| Polyurethane foam-montmorillonite composite material (comparison) | 12.7 |
| Polyurethane foam-graphite oxide-montmorillonite composite material of Example 3 (invention) | 17.3 |

It can be seen from the above Table 3 that the polyurethane foams, which contain graphite or graphite oxide, do not produce a larger residue during the thermogravimetric analysis at 900° C., since the combustible material is burned up completely. If the polyurethane foam composite material contains a phyllosilicate, namely montmorillonite, there is a clear improvement in the residue of the thermogravimetric analysis. Surprisingly, the inventive combination of graphite and montmorillonite in the polyurethane foam composite material results in a synergistic improvement in the ash residue during thermogravimetric analysis, so that this material of Example 3 is surprisingly well suited for the intended application as a fire retardant.

It can be seen from the above Tables 1 to 3 that, with the inventive polyurethane-graphite oxide composite materials, products are obtained, which, when exposed to a flame, have an ash crust with excellent properties. The inventive composite materials, which contain montmorillonite, that is, a phyllosilicate, as well as the graphite oxide, exhibit a synergistic improvement in the ash residue during thermogravimetric analysis.

The above examples and comparison examples, make it clear that, in contrast to strictly polyurethane foams, which do not form an ash crust when combusted and, instead, merely melt and burn, the inventive polyurethane-graphite oxide composite materials form a relatively stable ash crust with adequate hardness, and, with that, are outstandingly suitable for fire protection applications. According to a preferred embodiment, these strictly polyurethane foam-graphite oxide composite materials will provide a synergistic improvement in the fire resistance of the ash crust formed by the introduction of phyllosilicates, for which the polyurethane matrix is intercalated between the layers of the phyllosilicate as well as between the layers of the graphite oxide.

What is claimed is:

1. A polyurethane-graphite oxide composite material, characterized by a polyurethane matrix comprising expanded graphite oxide, which is present as a nano composite in the form of graphite oxide layers, randomly distributed in the polyurethane matrix, and/or in the form of well oriented graphite oxide multilayers, between which the polyurethane matrix material is intercalated and an optionally modified phyllosilicate, which is present as a nano composite in the form of silicate layers (delaminated structure), randomly distributed in the polyurethane matrix, and/or in the form of well oriented silicate multilayers, between which the polyurethane matrix material is intercalated (intercalated structure) in addition to the graphite oxide in the polyurethane matrix.

2. The polyurethane-graphite oxide composite material of claim 1, characterized in that the graphite oxide with the intercalated structure is present with a distance between the layers of graphite oxide of 0.7 nm to 400 nm in the polyurethane matrix.

3. The polyurethane-graphite oxide composite material of claim 2, characterized in that the distance between the layers of the graphite oxide with intercalated or delaminated structure is at least 100% larger than the corresponding distance in the starting graphite oxide.

4. The polyurethane graphite oxide composite material of claim 2, characterized that the graphite oxide with the intercalated structure is present with a distance between the layers of graphite oxide of 0.9 nm-200 nm and the polyurethane matrix.

5. The polyurethane-graphite oxide composite material of claim 1, characterized in that the distance between the layers of the graphite oxide with intercalated or delaminated structure is at least 100% larger than the corresponding distance in the starting graphite oxide.

6. The polyurethane-graphite oxide composite material of claim 1, characterized in that the graphite oxide particles, present in the composite material, have an average particle size of 0.2 μm to 150 μm.

7. The polyurethane graphite oxide material of claim 6, characterized that the graphite oxide particles present in the composite material, have an average particle size of 2 µm-100 µm.

8. The polyurethane-graphite oxide composite material of claim 1, characterized in that it contains 0.1 to 30% by weight of the polyurethane-graphite oxide composite material.

9. The polyurethane graphite oxide composite material of claim 8, characterized in that it contains 0.5-10% by weight of the graphite-oxide, based upon the total weight of the polyurethane graphite oxide composite material.

10. The polyurethane-graphite oxide composite material of claim 1, characterized in that it contains, as phyllosilicate, a 2:1 phyllosilicate.

11. The polyurethane-graphite oxide composite material of claim 10, characterized in that it contains graphite oxide and phyllosilicate in a ratio by weight of 10:1 to 10.

12. The polyurethane-graphite oxide composite material of claim 11, characterized in that it contains graphite oxide and phyllosilicate in a ratio by weight of 5:1-1:5.

13. The polyurethane-graphite oxide composite material of claim 10, characterized in that the phyllosilicate is present as a nano composite in the form of silicate layers (delaminated structure), randomly distributed in the polyurethane matrix, and/or in the form of well oriented silicate multilayers, between which the polyurethane matrix material is intercalated (intercalated structure) in addition to the graphite oxide in the polyurethane matrix.

14. The polyurethane graphite oxide composite material of claim 10, characterized in that the 2:1 phyllosilicate is selected from the group consisting of montmorillonite, hectorite, spanoite, and mixtures thereof.

15. The polyurethane-graphite oxide composite material of claim 10, characterized in that it contains 0.5-10% by weight of the phyllosilicate, the total amount of graphite oxide and phyllosilicate in the composite material being 0.5-10% by weight, based on the total weight of a polyurethane-graphite oxide composite material.

16. The polyurethane-graphite oxide composite material of claim 1, characterized in that the phyllosilicate, having the intercalated structure, is present with a distance between silicate layers of 0.7 nm to 400 nm.

17. The polyurethane-graphite oxide composite material of claim 16, characterized in that the distance between the layers of silicate is at least 100% larger in a case of the phyllosilicate with the intercalated or delaminated structure than in the case of the phyllosilicate starting material.

18. The polyurethane graphite oxide composite material of claim 16 characterized in that the phyllosilicate, having the intercalated structure, is present with the distance between silicate layers of 0.9 nm-200 nm.

19. The polyurethane-graphite oxide composite material of claim 1, characterized in that the phyllosilicate particles, present in the composite material, have an average particle size of 0.2 µm to 150 µm.

20. The polyurethane-graphite oxide composite material of claim 19 characterized in that the phyllosilicate particles, present in the composite material, have an average particle size of 0.2 µm-150 µm.

21. The polyurethane-graphite oxide composite material of claim 1, characterized in that it contains 0.1 to 30% by weight of the phyllosilicate, the total amount of graphite oxide and phyllosilicate in the composite material being 0.1 to 30% by weight based on the total weight of the polyurethane-graphite oxide composite material.

22. The polyurethane graphite oxide composite material of claim 21 characterized in that it contains 0.5-10% by weight of the phyllosilicate, the total amount of graphite oxide and phyllosilicate in the composite material being 0.5-10% by weight base on the total weight of the polyurethane-graphite oxide composite material.

23. The polyurethane-graphite oxide composite material claim 1, characterized in that it may be obtained by the in situ polycondensation of at least one polyol, present as intercalated compound in the graphite oxide and optionally in the phyllosilicate, with at least one polyisocyanate or by the in situ polycondensation of at least one polyisocyanate, present as intercalated compound in the graphite oxide and optionally in the phyllosilicate, with at least one polyol.

24. The polyurethane-graphite oxide composite material of claim 1, characterized in that it is present in the form of a hard, soft or elastomeric, foamable, foamed or not foamed polyurethane system.

25. The polyurethane-graphite oxide composite material of claim 24, characterized in that the polyurethane system is present as an optionally foamed coating, as an optionally foamable and optionally curable molding composition, as a curable molded part, as a foamed molded composition, as a foamed molded part or as a 1-component or 2-component in situ foaming system.

26. A material as claimed in claim 1 for use as fire retardant material and as a flame-retardant seal for openings, and/or bushings in walls, floors and/or ceilings of buildings.

27. A method for the preparation of polyurethane-expanded graphite oxide composite material, which comprises:
a.) intercalating at least one polyol in expanded graphite oxide and in a phyllosilicate and, subsequently reacting the expanded intercalated graphite oxide- and phyllosilicate intercalation compound with at least one polyisocyanate to form the polyurethane-expanded graphite oxide composite material or;
b.) intercalating at least one polyisocyanate in expanded graphite oxide and in a phyllosilicate and subsequently reacting the expanded intercalated graphite oxide and the phyllosilicate intercalation compound with at least one polyol to form the polyurethane-expanded graphite oxide composite material.

28. The method of claim 27, characterized in that the graphite oxide and the phyllosilicate have an average particle size of 0.2 µm to 150 µm.

29. The method of claim 28, characterized in that the graphite oxide and the phyllosilicate have an average particle size of 2 µm-100 µm.

30. The method of claim 27, characterized in that, before the intercalation of the at least one polyol, the graphite oxide is subjected to a treatment with a quaternary ammonium salt and/or a cationic surfactant.

31. The method of claim 30, wherein before the intercalation of the at least one polyol, the graphite oxide is subjected to a treatment with cetyltriethylammonium bromide for modifying of a polarity of the graphite oxide.

32. The method of claim 27, characterized in that the graphite oxide, before the intercalation of the at least one polyol, is washed with distilled water up to a pH of 6 to 8.

33. The method of claim 32, wherein the graphite oxide, before the intercalation of the at least-one polyol, is washed with distilled water up to a pH of 7.

* * * * *